Button & Blake,
Fire Engine.
No. 755. Reissued July 12, 1859.
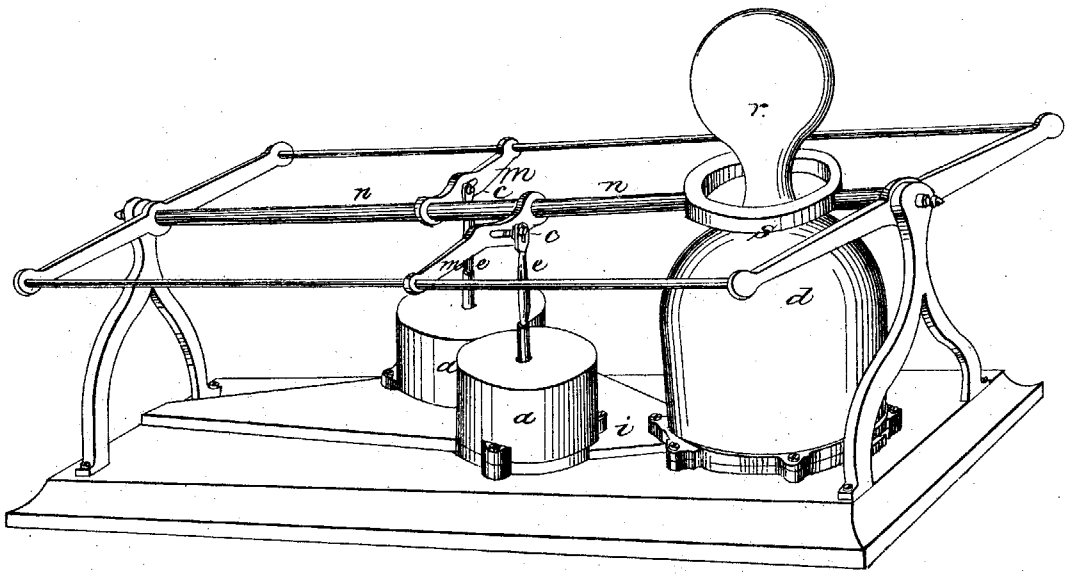
N. PETERS, PHOTO-LITHOGRAPHER, WASHINGTON, D. C.

UNITED STATES PATENT OFFICE.

LYSANDER BUTTON AND R. BLAKE, OF WATERFORD, NEW YORK.

IMPROVEMENT IN FIRE-ENGINES.

Specification forming part of Letters Patent No. 22,162, dated November 30, 1858; Reissue No. 755, dated July 12, 1859.

*To all whom it may concern:*

Be it known that we, LYSANDER BUTTON and ROBERT BLAKE, of Waterford, in the county of Saratoga and State of New York, have invented certain Improvements in Fire-Engines; and I do hereby declare that the following is a full, clear, and exact description of the principle or character which distinguish them from all other things before known, and of the usual manner of making, modifying, and using the same, reference being had to the accompanying drawings, which exhibits in perspective those parts of the engine embracing our improvement.

Our invention consists in certain improvements in fire engines, described and represented as follows:

Instead of arranging the cylinders *a a* directly across or in a line at right angles to the line of the length of the engine-box, as in the common practice, we place the cylinders diagonally across the box, as shown in the drawing. By this arrangement we realize the following important advantages: First, we can increase the diameter and capacity of the cylinders without increasing the width of the box, and consequently we can make a much greater change in the capacity of the cylinders by varying the length of the stroke. The piston-rods *e e*, being connected to the arms *m m* of the rock-shaft *n* by an adjustable pivot-bearing, *c*, it is evident that increasing the length of the stroke to attain a given increase in the capacity of the cylinder would make the action upon the piston more oblique and unfavorable, and also that the greater the diameter of the cylinder the less the obliquity required in piston-rod to the arm *m* to attain this given increase of capacity; secondly, by the increased diameter we get straighter and shorter water-ways *i* and increased valve space, thus essentially diminishing the resistance to the flow of water.

We make the air-chamber *d* of our engine substantially of the form shown in the drawing, producing a contraction, *r*, at about half its height for the twofold purpose, first, of retaining the air permanently in the upper part of the chamber, and, secondly, we are enabled to pass the air-chamber through the rock-shaft *n*; or, in other words, to embrace the air-chamber by a moderate enlargement and circular opening *s* of the rock-shaft *n*.

In air-chambers of ordinary shapes the air in the upper part of the chamber frequently gets washed out, as it were, the agitation of the water from the working of the pumps causing an entanglement of the air in the water, with which it escapes. This operation is prevented by the contraction *r* in the air-chamber, the agitation of the water not affecting the air above the contraction. The effect of the contraction is, in fact, to divide the vessel into an air and water chamber, and we designate this form of the vessel as the "hour-glass" contraction, to distinguish it from other forms of air-vessels.

It is evident that the contraction or its equivalent may be made without any exterior contraction by placing a perforated diaphragm in an ordinary air-vessel; but by making the contraction on the exterior of the air-vessel we gain another important advantage. We are enabled to use a high air-vessel placed in the central line of the length of the box, or in the line of the rock-shaft, without interfering with the rock-shaft. The rock-shaft is enlarged or spread into a ring, *s*, which encircles the contraction, and thus the air-vessel may be said to pass through the rock shaft.

What we claim as our improvements in fire-engines is, placing the cylinders diagonally to the line of the rock-shaft, substantially in the manner and for the purpose herein set forth.

We do not claim contracting the air-vessel at its base or its point of attachment to the water-ways or channels of fire-engines; but We do claim—

1. Combining with the water-way or channel *i* the air chamber *d*, divided into two compartments by the contraction *r*, at or about one-half the height of said air chamber above its base or point of attachment to said water-way, substantially in the manner and for the purposes herein set forth.

2. In combination with the hour-glass contraction of the air-chamber the ring enlargement *s* of the rock-shaft, as herein set forth.

LYSANDER BUTTON.
ROBERT BLAKE.

Witnesses:
JOHN O. MOTT,
JOHN A. WALDRON.